Patented Feb. 13, 1945

2,369,159

UNITED STATES PATENT OFFICE 2,369,159

VITAMIN A DERIVATIVES AND METHOD OF MAKING SAME

Nicholas A. Milas, Belmont, Mass., assignor to Research Corporation, New York, N. Y., a corporation of New York No Drawing. Application December 15, 1941, Serial No. 423,120

12 Claims. (Cl. 260—611)

The object of the present invention is to provide a method for the synthesis of 1-[2',6',6'-trimethyl cyclohexen-1'-yl]-3,7-dimethyl 10-alkoxy deca-1,3,5,7-tetraene or simply alkoxy methyl vitamin A (Compound I) and 1-[2',6',6'-trimethyl cyclohexen-1'-yl]-3,7-dimethyl 10-alkoxy deca-5-yne-1,3,7-triene or simply alkoxy methyl dehydro vitamin A (Compound II).

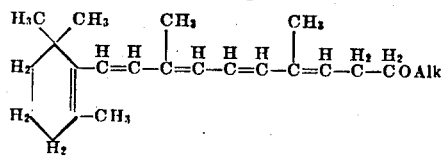

in which Alk represents an alkyl group

*Compound I*

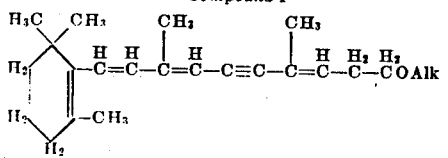

in which Alk represents an alkyl group

*Compound II*

The invention resides in the method or methods hereinafter described and in certain of the compounds or products formed as defined in the appended claims.

The invention will be illustrated by the synthesis of the ethoxy compound in each case but it is to be understood that the ethoxy group is merely representative of the analogous alkoxy groups such as the lower alkoxy groups, methoxy, propoxy, butoxy, etc.

The first essential step in the synthesis of the ethoxy methyl vitamin A consists in allowing the aldehyde (Compound III) to react in a suitable solvent, such as ether, with Compound IV, in which M may be either a metal of the first group of the periodic system or a univalent radical such as —MgBr, —CaBr or —ZnBr followed by hydrolysis to produce Compound V.

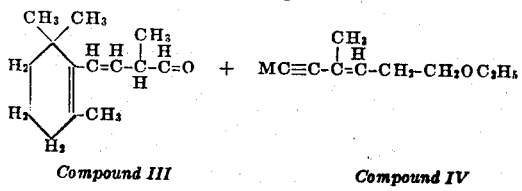

*Compound III*   *Compound IV* in ether | subsequent hydrolysis

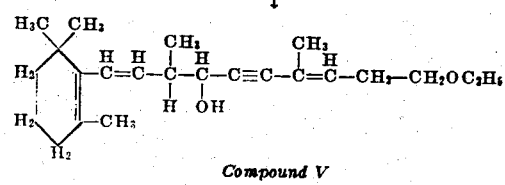

*Compound V*

To obtain Compound II, Compound V is dehydrated by distilling from it a mixture of p-toluene sulfonic acid and benzene or toluene to remove the water as soon as it is formed. It can also be dehydrated by first forming the chloride or bromide through reaction in pyridine with phosphorus trichloride or tribromide followed by dehydrohalogenation with alcoholic potash.

V $\xrightarrow[\text{pyridine followed by alcoholic potash}]{\text{p-toluene sulfonic acid}}$

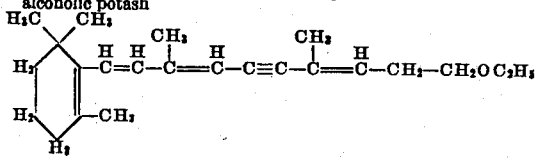

*Compound II (ethoxy)*

To prepare Compound I, Compound V is partially hydrogenated with gaseous hydrogen in the presence of finely divided palladium deposited on a suitable support or under hydrogen pressure in the presence of finely divided active iron catalyst to give Compound VI.

Compound V $\xrightarrow[\text{Pd or Active Fe}]{H_2}$

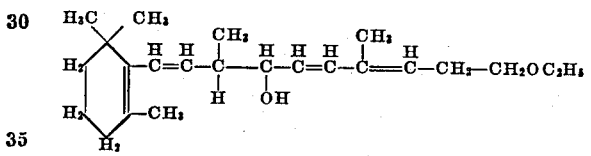

*Compound VI*

Compound VI can then be dehydrated with p-toluene sulfonic acid or dehydrohalogenated as in the case of Compound V to give Compound I.

Compound VI $\xrightarrow[\text{or PCl}_3 \text{ or PBr}_3 \text{ in pyridine followed by alcoholic potash}]{\text{p-toluene sulfonic acid}}$

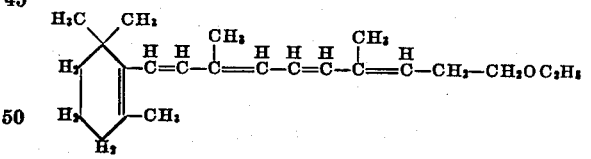

*Compound I (ethoxy)*

Compound I can also be prepared by partial hydrogenation of Compound II using finely divided palladium black deposited on calcium carbonate or barium sulfate.

Both Compounds I and II can also be prepared by allowing Compound III to react with Compound VII in anhydrous ether to form Compound VIII which is then converted to either I or II.

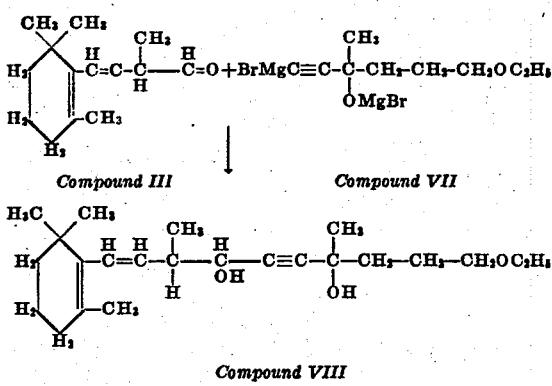

*Compound III*   *Compound VII*

*Compound VIII*

To convert Compound VIII to Compound II, the former is mixed with p-toluene sulfonic acid and toluene and the latter distilled to carry over the water formed. Compound II can also be prepared by first converting Compound VIII into the dichloride by means of phosphorus trichloride in pyridine and the dichloride dehydrochlorinated with alcoholic potash.

To prepare Compound I from Compound VIII, the latter is first partially hydrogenated in the presence of finely divided palladium black and the partially hydrogenated product either dehydrated directly with p-toluene sulfonic acid and toluene or first converted to the dichloride and the latter dehydrochlorinated with alcoholic potash.

Compound IV is prepared by allowing the vinyl acetylene (Compound IX) to react in liquid ammonia with a metal of the First Group of the Periodic System or with an organo-metallic compound such as ethyl magnesium bromide in anhydrous ether.

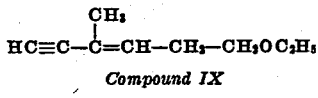

*Compound IX*

Compound VII is prepared by allowing the acetylene carbinol (Compound X) to react with two moles of ethyl magnesium bromide in anhydrous ether.

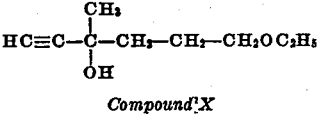

*Compound X*

Compound X has been prepared in good yields by allowing gamma-ethoxypropyl methyl ketone to react in liquid ammonia with sodium acetylide or with potassium acetylide in t-butyl or t-amyl alcohols as follows:

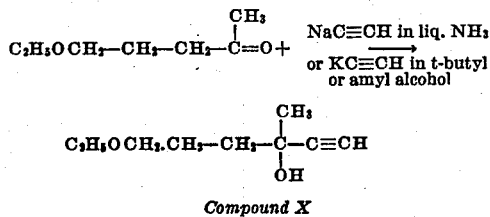

*Compound X*

Compound IX has been prepared by passing the vapors of Compound X through a tube containing aluminum phosphate and kept at temperatures between 200° and 275° C. It has also been prepared by heating Compound X with p-toluene sulfonic acid in the presence of toluene or xylene. A third method used to prepare Compound IX is by converting Compound X into the monobromoacetylene or monochloroacetylene, both of which were subsequently dehydrohalogenated with alcoholic potash.

A more detailed description of the various synthesis is to be found in the following pages.

*Synthesis of gamma-ethoxypropyl methyl ketone.*—Place in a three-necked, 3-liter flask fitted with a mercury seal stirrer and a reflux condenser 1200 cc. of absolute alcohol and dissolve in it 65 g. of metallic sodium. To this mixture add slowly with stirring 367 g. acetoacetic ester and heat the final mixture until it refluxes gently, then add slowly 435 g. of ethyl bromoethyl ether in the course of two hours. Allow the mixture to reflux overnight with stirring, then remove most of the alcohol by distillation under reduced pressure, cool the residual liquid and neutralize with dilute hydrochloric acid. The final mixture separates into two layers, the upper or oily layer is withdrawn, and any product dissolved in the aqueous layer salted out and extracted with ether. The combined product is dried with anhydrous magnesium sulfate, filtered and the ether and considerable amount of the dissolved alcohol removed under reduced pressure. Saponify the residue in about 2 liters of water containing 146 g. of sodium hydroxide by stirring the mixture at room temperature overnight. Continue stirring while you run into the mixture a solution of 190 g. of concentrated sulfuric acid and 190 cc. of water. The mixture separates into two layers, the upper layer, or the ketone layer, is removed, and the aqueous layer again salted out and extracted with ether. The first upper layer and the ether extract are then combined, dried over magnesium sulfate and the ether removed. The residual oil is then fractionated and the fraction boiling at 169.5–170° (757 mm.) collected. This ketone forms a semicarbazone, M. P. 86–87.5° C.

Calcd. for $C_8H_{17}O_2N_3$: N, 22.4. Found: N, 21.7, 22.2.

*Synthesis of 3-methyl 3-hydroxy 6-ethoxy hexyne-1 (Compound X).*—Saturate one and a half liters of liquid ammonia with dry acetylene and while stirring and passing acetylene through the solution add 15.4 g. of metallic sodium in the course of ½ hour keeping the temperature of the mixture at −45° to −50°. Continue passing acetylene through the mixture for 2 hours longer, then cool to −70° and add 87.2 g. of gamma-ethoxypropyl methyl ketone in the course of 2 hours. Continue stirring and passing acetylene for at least 9 hours longer, then allow ammonia to evaporate. Add 350 cc. of ether to the residue, cool mixture to 0° and add 88.5 g. of ammonium sulfate in 300 cc. of water. Separate ether layer and extract aqueous layer twice again with 300 cc. of ether. Combine extracts and dry over magnesium sulfate. Remove ether and fractionate the residue and collect the product boiling at 93–95° (12 mm.) Yield about 70% of theory. $N_D^{24}$ 1.4466, $N_D^{20}$ 1.4482, $d_4^{20}$ 0.938. Unsaturation for $C_9H_{16}O_2$: 2 F. Found: 1.87, 212 F. —$OC_2H_5$: 28.8. Found: 28.2.

Compound X was also synthesized by the following alternative method: to 260 cc. of anhydrous t-butyl alcohol in a 3-necked flask fitted with a stirrer, a dropping funnel and a side tube, add cautiously 18.5 g. of metallic potassium, then saturate the solution with dry acetylene, and, while the latter is passing through the mixture, add dropwise 60 g. of gamma-ethoxypropyl methyl ketone in the course of one hour. Continue stirring and passing acetylene through the mixture for about 6 hours longer. Acidify the mixture with a concentrated solution of tartaric acid whereby it separates into two layers. Remove the upper layer, dry with anhydrous magnesium sulfate, filter and fractionate the filtrate. Collect the fraction boiling at 86–89° (10 mm.). Yield, 22 g. This has the same properties as that prepared by the previous method.

*Synthesis of 3-methyl 6-ethoxy hexyne-1-ene-3 (Compound IX).*—Twenty grams of 3-methyl 3-hydroxy 6-ethoxy hexyne-1 was passed under reduced pressure (11 mm.) through a tube containing a mixture of aluminum phosphate and pumice and kept at temperature between 265° and 270° C. A yield of 6.8 g. of the vinyl acetylene hydrocarbon boiling at 55–55.5° (12 mm.) was obtained per pass. $N_{20}^D$ 1.4522, $d_4^{20}$ 0.8538. Unsaturation for $C_9H_{14}O$: 3 F. Found: 3.07 F. —$OC_2H_5$: 32.6. Found: 30.4, 33.4.

The same dehydration was also accomplished using lower temperatures (200°–250°) with somewhat lower yields. Still smaller yields were obtained by dehydrating the acetylene carbinol with p-toluene sulfonic acid or succinic anhydride. The product, however, was identical with that obtained by high temperature dehydration.

An alternative procedure for the synthesis of 3-methyl 6-ethoxy hexyne-1-ene-3 is as follows: To 6.5 g. of phosphorus tribromide is added about 0.5 cc. of anhydrous pyridine, 10 cc. of dry benzene, and the mixture cooled to —5°. To this mixture is then slowly added with constant shaking a mixture of 10 g. of 3-methyl 3-hydroxy-6-ethoxy hexyne-1, 10 g. of anhydrous pyridine and 10 cc. of dry benzene in the course of one hour. The mixture is then allowed to warm to room temperature, shaking being continued for two hours. Ten g. of potash in about 100 cc. of 95% alcohol is then quickly added. The mixture becomes hot and deep brown with the separation of a solid salt. After standing for one hour, the mixture is cooled and extracted with ether and the ethereal extract shaken with dilute phosphoric acid to remove the pyridine, dried with magnesium sulfate and ether removed. When the residue was fractionated about 4 g. distilled at 60–64° (14 mm.). This was identical in properties with the product obtained by high temperature dehydration.

*Synthesis of 1-[2',6',6'-trimethyl cyclohexen-1'-yl]-3,7-dimethyl 4-hydroxy 10-ethoxy deca-5-yne-1,7-diene (Compound V).*—A Grignard reagent was prepared in 200 cc. of anhydrous ether from 1.18 g. of magnesium (0.0486 mol) and 5.3 g. (0.0486 mol) of ethyl bromide freshly distilled from phosphorus pentoxide. The mixture was then cooled to 0° and added to it with rapid stirring and in a stream of nitrogen, 7.3 g. (0.0534 mol) of 3-methyl 6-ethoxy hexyne-1-ene-3 in 25 cc. of anhydrous ether in the course of one-half hour. The mixture was then gently refluxed for 3 hours to complete the reaction in the formation of Compound IV. Once again the mixture was cooled to 0° and with rapid stirring added to it 10 g. (0.0486 mol) of Compound III and 10 cc. of anhydrous ether in the course of one hour. The final mixture was gently refluxed overnight, then poured on ice mixed with 10 g. of ammonium sulfate. The ether layer was then separated, dried and the ether removed. The residue was then subjected to a high vacuum ($10^{-4}$ to $10^{-5}$ mm.) and temperature up to 100° to remove any unreacted products that might have been present. The residue was analyzed. Unsaturation, calcd. for Compound V: 5 F. Found (semimicrohydrogenation): 4.81 F.

*Synthesis of 1-[2',6'6'-trimethyl cyclohexen-1-yl]-3,7-dimethyl 4-hydroxy 10-ethoxy deca-1,5,7-triene (Compound VI).*—This compound was simply prepared by adding the calculated amount (one mol) of hydrogen gas to Compound V using finely divided palladium black as the catalyst and alcohol or glacial acetic acid as solvents.

*Synthesis of 1-[2',6',6'-trimethyl cyclohexen-1-yl]-3,7-dimethyl 10-ethoxy deca-1,3,5,7-tetraene (Compound I).*—A mixture of 2.04 g. of phosphorus tribromide in 25 cc. dry benzene and a few drops of anhydrous pyridine was cooled to about —5° and to it was added dropwise with constant shaking a mixture of 2.6 g. of Compound VI, 25 cc. of dry benzene and 3 cc. of anhydrous pyridine in the course of one hour. The resulting mixture was then brought to room temperature, then heated to 60–70° for ½ hour. It was then cooled and poured on cracked ice. The mixture was then extracted three times with ether, the ether extract washed four times with 50 cc. portions of 5% phosphoric acid to remove pyridine and once with water and dried over magnesium sulfate.

The ether from the foregoing preparation was removed under reduced pressure and the residue (bromide) was heated to 70–80° for 1½ hours in nitrogen under reduced pressure with 80 cc. methyl alcohol containing 5 g. of potash. The final mixture was cooled and diluted with three times its volume of water and the resulting mixture extracted with ether, the extract dried and the ether removed. The residue gave a bluish color with antimony trichloride in chloroform exhibiting bands at 486, 532, 580 and 640 m$\mu$. This material when fed in olive oil to vitamin A deficient rats showed a very pronounced antixerophthalmic property.

Compound I was also prepared by dissolving compound VI in toluene, adding about 0.1 mol of anhydrous p-toluene sulfonic acid and distilling the toluene under slightly reduced pressure. This process dehydrated Compound VI to Compound I.

*Synthesis of 1-[2',6',6'-trimethyl cyclohexen-1'-yl]-3,7-dimethyl 10-ethoxy deca-5-yne-1,3,7-triene (Compound II).*—This substance is prepared by dissolving Compound V in toluene or xylene, adding about 0.1 mol of anhydrous p-toluene sulfonic acid and distilling the toluene or xylene under slightly reduced pressure so that the temperature of the reaction mixture does not rise much above 100° C. When water ceases to distill over with the solvent, the mixture is subjected to a high vacuum to remove all of the solvent and the residue taken up in ether and washed with dilute alkali to remove the p-toluene sulfonic acid. Compound II was finally recovered by removing the ether under reduced pressure.

*Synthesis of 1-[2',6',6'-trimethyl cyclohexen-1'-yl] - 3,7 - dimethyl 4,7 - dihydroxy 10 - ethoxy deca-5-yne-1-ene (Compound VIII).*—A Grignard is prepared in 200 cc. of anhydrous ether by allowing 2.48 g. (0.102 mol) of magnesium to react with 11.1 g. (0.102 mol) of ethyl bromide. The mixture is then rapidly stirred and cooled to 0° and to it added dropwise 8.9 g. (0.0571 mol) of 3-methyl 3-hydroxy 6-ethoxy hexyne-1 (Compound X) in 60 cc. of dry ether in the course of one hour. Compound VII is formed as a thick finely divided semisolid. The mixture is gently refluxed for 3 hours then cooled to 0° again and to it added 10 g. (0.0486 mol) of Compound III in 20 cc. of anhydrous ether in the course of one hour. To complete the reaction, the mixture was further gently refluxed in an atmosphere of nitrogen for 30 hours, then poured on a mixture of cracked ice and ammonia sulfate. The final mixture is extracted three times with ether, the ether dried and removed under reduced pressure. The residue is subjected to a high vacuum ($10^{-4}$–$10^{-5}$ mm.) at temperatures between 80 and 100° C. for 5 hours to remove low boiling products. Unsaturation calcd. for Compound VIII: 4 F. Found (semimicrohydrogenation): 4.24 F.

Compound VIII is converted into Compound II by dissolving 2 g. of it in toluene (50 cc.), adding 0.039 g. of anhydrous p-toluene sulfonic acid, and distilling the toluene under slightly reduced pressure at temperatures below 100° C. The final product was freed from p-toluene sulfonic acid by washing with dilute alkali.

For the synthesis of Compound I from Compound VIII, the latter is first hydrogenated to 1-[2',6',6'-trimethyl cyclohexen - 1' - yl] - 3,7 - dimethyl 4,7-dihydroxy 10-ethoxy deca-1,5-diene in the presence of finely divided palladium. The partially hydrogenated product is then converted to Compound I either by direct dehydration using p-toluene sulfonic acid in toluene or xylene or by converting it first to the dichloride or the dibromide and dehydrohalogenating the same with alcoholic potash.

Cool a mixture of 6.9 g. of phosphorous tribromide in 25 cc. dry benzene and a few drops of anhydrous pyridine to —5° and add to this mixture dropwise in the course of one-half hour with shaking a solution of 4.62 g. of 1-[2',6',6'-trimethyl cyclohexen-1'-yl]-3,7-dimethyl 4,7-dihydroxy 10-ethoxy deca-1,5-diene, 25 cc. of dry benzene and 6.5 cc. of anhydrous pyridine. The mixture was allowed to stand in an atmosphere of nitrogen at room temperature for 2 hours, then heated to 60–70° C. for 45 minutes, then cooled and poured on cracked ice and extracted with ether. The ether extract was shaken with two 50 cc. portions of 5% phosphoric acid, then with water and the ether removed under reduced pressure. The residue was heated to 70° for one hour in an atmosphere of nitrogen with 80 cc. of methyl alcohol containing 10 g. of potash. The entire mixture was cooled and diluted twice with water and extracted with ether, the ether extract dried and the ether removed. A yield of two grams of the product was obtained having the spectroscopic and biological properties of Compound I.

I claim:

1. Process which comprises reacting a gamma alkoxy propyl methyl ketone with an alkali metal acetylide to the production of a 3-methyl-3-hydroxy-6-alkoxy hexyne 1, converting the latter into the corresponding double Grignard compound thereof, reacting said Grignard compound with an aldehyde compound of the formula

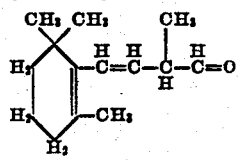

to the production of a 1-[2',6',6'-trimethyl cyclohexen-1'-yl]-3,7-dimethyl 4,7 dihydroxy 10 alkoxy deco-5-yne-1-ene, and successively hydrogenating and dehydrating the resulting compound.

2. Process as defined in claim 1 in which the 1-[2',6',6'-trimethyl cyclohexen-1' - yl] - 3,7 - dimethyl 4,7 dihydroxy 10 alkoxy deco-5-yne-1-ene is first hydrogenated at the triple bond and then dehydrated.

3. Process as defined in claim 1 in which the 1-[2',6',6'-trimethyl cyclohexen-1' - yl] - 3,7 - dimethyl 4,7 dihydroxy 10 alkoxy deco-5-yne-1-ene is first dehydrated and then hydrogenated.

4. Process which comprises reacting a gamma alkoxy propyl methyl ketone with an alkali metal acetylide to the production of a 3-methyl-3-hydroxy-6-alkoxy hexyne 1, dehydrating the latter to the corresponding vinyl acetylene, replacing the hydrogen of the acetylene group by a substituent of the group consisting of monovalent metals and organo metallic groups, reacting the resulting compound with an aldehyde of the formula

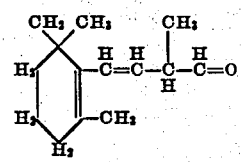

to the production of 1-[2',6',6'-trimethyl cyclohexen-1'-yl]-3,7-dimethyl 4-hydroxy 10-alkoxy deca-5-yne-1,7-diene, and successively dehydrating and hydrogenating the latter.

5. Process as defined in claim 4 in which the 1-[2',6',6'-trimethyl cyclohexen-1' - yl] - 3,7 - dimethyl 4-hydroxy 10-alkoxy deca-5-yne-1,7-diene is first dehydrated and the dehydrated product hydrogenated.

6. Process as defined in claim 4 in which the 1-[2',6',6'-trimethyl cyclohexen-1' - yl] - 3,7 - dimethyl 4-hydroxy 10-alkoxy deca-5-yne-1,7-diene is hydrogenated and the hydrogenated product dehydrated.

7. Process which comprises reacting an aldehyde of the formula

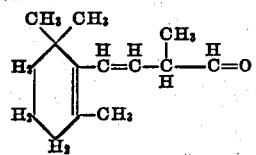

with a compound of the group consisting of

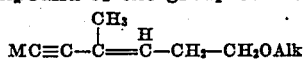

in which Alk stands for a lower alkyl group and M stands for a member of the group consisting of metals of the first group of the Periodic System and univalent organo metallic groups and

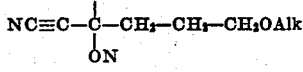

in which Alk stands for a lower alkyl group and N stands for a univalent organo metallic radical.

8. Process which comprises reacting an aldehyde of the formula

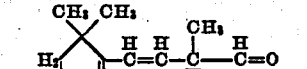

with a compound of the formula

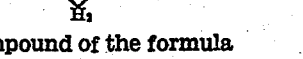

in which alk stands for a lower alkyl group and

M stands for a member of the group consisting of metals of the first group and univalent organo metallic radicals.

9. Process which comprises reacting an aldehyde of the formula

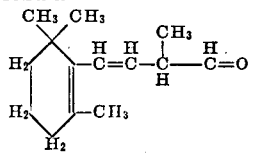

with a compound of the formula

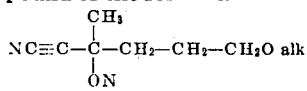

in which alk stands for a lower alkyl group and N stands for a univalent organo metallic radical.

10. As a new product a compound of the formula

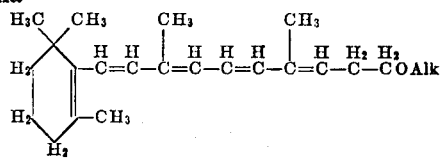

in which Alk stands for a lower alkyl group.

11. As a new product a compound of the formula

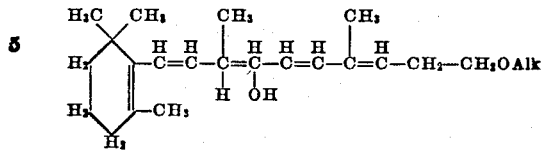

in which Alk stands for an alkyl group.

12. As a new product a compound of the formula

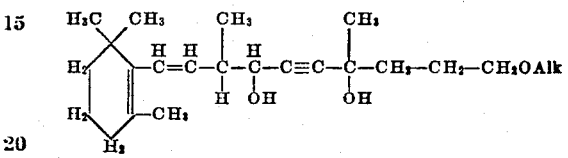

in which Alk stands for an alkyl group.

NICHOLAS A. MILAS.